US006607771B2

(12) United States Patent
Benczedi et al.

(10) Patent No.: US 6,607,771 B2
(45) Date of Patent: Aug. 19, 2003

(54) PROCESS FOR THE PREPARATION OF GRANULES FOR THE CONTROLLED RELEASE OF VOLATILE COMPOUNDS

(75) Inventors: Daniel Benczedi, Carouge (CH); Pierre-Etienne Bouquerand, Pers-Jussy (FR)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 09/847,899

(22) PCT Filed: Aug. 23, 2000

(86) PCT No.: PCT/IB00/01155
§ 371 (c)(1),
(2), (4) Date: Jun. 27, 2001

(87) PCT Pub. No.: WO01/17372

PCT Pub. Date: Mar. 15, 2001

(65) Prior Publication Data

US 2001/0036503 A1 Nov. 1, 2001

Related U.S. Application Data

(63) Continuation of application No. PCT/IB00/01155, filed on Aug. 23, 2000.

(30) Foreign Application Priority Data

Sep. 6, 1999 (WO) ................ PCT/IB99/01510

(51) Int. Cl.[7] .................................................. A23L 1/00
(52) U.S. Cl. ...................... 426/516; 426/533; 426/650
(58) Field of Search ................ 426/516, 448, 426/533, 650

(56) References Cited

U.S. PATENT DOCUMENTS

| 2,856,291 | A | | 10/1958 | Schultz | 99/140 |
| 4,060,645 | A | | 11/1977 | Risler et al. | 426/302 |
| 4,707,367 | A | | 11/1987 | Miller et al. | 426/96 |
| 4,880,585 | A | | 11/1989 | Klimesch et al. | 264/141 |
| 4,965,085 | A | * | 10/1990 | Heyland et al. | 426/533 |

FOREIGN PATENT DOCUMENTS

| EP | 0 202 409 | 11/1986 |
| EP | 0 240 906 | 10/1987 |
| EP | 0 284 747 | 10/1988 |
| GB | 2 290 693 | 1/1996 |
| WO | WO 94/06308 | 3/1994 |
| WO | WO 98/03188 | 1/1998 |
| WO | WO 98/18610 | 5/1998 |

* cited by examiner

*Primary Examiner*—George C. Yeung
(74) *Attorney, Agent, or Firm*—Winston & Strawn

(57) ABSTRACT

A process for shaping into a granular form a delivery system for the controlled release of flavor or fragrance compounds. This process includes the steps of preparing a mixture of a continuous phase carrier containing a volatile flavor or fragrance compound or composition finely divided therein and having a low water content. This guarantees that the glass transition temperature of the mixture is the glass transition temperature of the final product. The mixture is then heated within a screw extruder to a temperature of between 90 and 130° C. to form a molten mass, the molten mass is extruded through a die and then chopped as it exits the die. The latter step is performed at a temperature above the glass transition temperature of the carrier.

10 Claims, 2 Drawing Sheets

US 6,607,771 B2

PROCESS FOR THE PREPARATION OF GRANULES FOR THE CONTROLLED RELEASE OF VOLATILE COMPOUNDS

CROSS-REFERENCE TO RELATED APPLICATION

This application is a continuation of the U.S. national stage designation of International Application No. PCT/IB00/01155 filed on Aug. 23, 2000, the content of which is expressly incorporated herein by reference thereto.

TECHNICAL FIELD AND BACKGROUND ART

It is well known in the food industry that the addition of flavoring ingredients contributes to a major extent to the palatability of consumable edible materials; consequently, it is paramount to ensure the production of food products which are of consistent flavor quality and are thus attractive to consumers. This can be achieved by ensuring proper flavor release. In fact, taste and aroma are greatly influenced by volatile components present in such products. However, because of the volatility of these compounds, it is not easy to ensure that the predetermined critical amounts of each flavor component remains stable during food processing, cooking, baking, during transportation and storage and finally during the preparation of the food product by the consumer himself.

The losses of volatile components from the food products may produce undesirable variations in the taste and aroma of the products as perceived by the consumer. On the other hand, losses of volatile components might occur through the conversion of certain flavor materials into unwanted less desirable or tasteless chemicals by their interaction with reagents present in the environment. Oxygen is an example of this type of reagent as it promotes the conversion of several labile flavor materials of current and critical utilization in the industry.

It is not surprising therefore to observe that, in order to reduce or eliminate the above-mentioned problems associated with volatile and labile flavor components, various attempts have been made to encapsulate such components in certain carbohydrate matrices so as to reduce the volatility or lability of these components. Volatile flavor or fragrance ingredients are thus encapsulated in amorphous solid materials to protect them from evaporation, chemical reactions and physical interactions until needed. Solid formulations facilitate the handling of flavors and fragrances by customers and their cost in use is generally improved.

Another important reason for encapsulating flavors or fragrances is the control of the kinetics of flavor or fragrance release to induce sensory effects through sequential release. Therefore, in view of the growing demand from the industry for delivery systems allowing a controlled release of flavors or fragrances, the improvement of technical preparations of stable free flowing powders containing the flavor or fragrance compositions for the latter flavor or fragrance release is always of paramount importance.

The prior art has therefore developed a number of techniques for producing encapsulated volatile compounds. In essence, the literature in the field of the invention discloses the encapsulation of flavor materials in glass-like polymeric materials.

The understanding of the glassy state and its importance in food products has been considerably extended in recent years. Several methods of creating glass-like states have been reported. The concept of glass transition temperature (Tg) is well described in the literature. It represents the transition temperature from a rubbery liquid state to a glassy solid state; such a transition is characterized by a rapid increase in viscosity over several orders of magnitude and over a rather small temperature range. It is recognized by many experts in the field that, in the glassy state, i.e. at temperatures below Tg, all molecular translation is halted and it is this process which provides such effective entrapping of the volatile flavors and prevention of other chemical events such as oxidation.

Implicit in much of the literature is the converse, namely that at temperatures above Tg, the encapsulation of flavor molecules will be ineffective and hence the importance of creating polymeric encapsulating materials with Tg values above ambient temperature.

The physical state of an encapsulated flavor system can thus be expressed by the difference (T–Tg), T being the temperature surrounding the system, i.e. the extrusion temperature when reference is made to the encapsulation process, and the ambient or storing temperature, namely a temperature typically comprised between 20 and 25° C. when reference is made to the storage of the final product, after the end of the process.

When T is equal to Tg, the surrounding temperature corresponds to the glass transition temperature of the system; when (T–Tg) is negative, the system is in the glassy state and the more the difference is negative, the more viscous is the system. Conversely, in the rubbery state, i.e. when (T–Tg) is positive, the more positive is the difference, the less viscous is the system.

The difference (T–Tg) evolves during the different steps of an encapsulation process and is representative of the changes in the physical state and viscosity of the system.

In the processes described in the prior art, a homogeneous mixture of flavor material and carbohydrate matrix is generally prepared in the first step of the encapsulation process and is then heated in such a way that the temperature of the mixture is greater than the glass transition temperature of the matrix, in order to form a molten mass. More particularly, the system, in the first step of the prior art processes, is such that the difference (T–Tg) is very positive, providing a low viscosity rubbery melt. The molten mass is then extruded through a die.

Following the extrusion step, all the processes described in the prior art comprise an additional step which allows to decrease the difference (T–Tg), in other words to increase the viscosity of the system, in order to render it sufficiently viscous to be able to be shaped to provide the desired particles.

The patent literature in the field of the invention discloses several ways of lowering (T–Tg) after the extrusion step, either by decreasing the temperature T through a cooling step, or by increasing the glass transition temperature Tg through a drying step.

A typical example of extrusion techniques for preparing encapsulated volatile compounds is provided in U.S. Pat. No. 4,707,367 which describes a process for preparing a solid essential oil composition having a high content of essential oil, completely encapsulated within the extruded particulate solids. The process there-described comprises forming a homogeneous mixture combining matrix components and an essential oil flavor and extruding said homogeneous melt into a relatively cool liquid solvent. The cooling step induces the solidification and permits to form a solid extruded material which is further dried and combined with an anticaking agent to produce a stable and relatively non hygroscopic particulate essential oil composition in encapsulated form.

U.S. Pat. No. 2,856,291 also discloses a process for preparing solid flavor compositions which comprises forming a hot, liquid emulsion of a volatile flavoring agent in a melted sugar base, extruding the hot emulsion in the form of a continuous stream and cooling the stream to a plastic condition, thus reducing the difference (T−Tg) to be able to then subdivide the stream into rod shaped elements.

Another way to reduce (T−Tg) is to increase the glass transition temperature Tg. It is well known in the art that the ingress of water into the system can significantly reduce the Tg; a drying step can thus be carried out with the objective of increasing Tg. Said method is used in the wet-granulation. For instance, EP-A2-202409 describes a method for the production of stable, spherical particles of viable microorganisms which comprises the steps of mixing a culture concentrate with a bulking agent to form a homogeneous wet granulate, extruding the wet granulate through a die to produce filaments having a diameter of approximately the size of the desired spheres and then using a spheroniser device which comprises a plate that rotates at a tangential speed sufficient to cause the filaments to be shaped into discrete spherical particles, and finally drying the particles. Before the drying step, the glass transition temperature of the extruded mass is relatively low because of the large proportion of water used as solvent. The additional drying step is thus necessary to evaporate some water from the system, thus increasing the Tg to a sufficient value to provide a product capable of being stored at room temperature.

The prior art methods described here-above present major disadvantages.

First of all, all these processes provide at the end of the extrusion step an extruded molten mass which is not sufficiently viscous to be shaped into the final desired product. Consequently, all these processes require, following the extrusion step, an additional step (drying or cooling), which aims at increasing the viscosity of the system, thus reducing the difference (T−Tg).

Moreover, the shaping step of the above-described processes often leads to a size distribution of particles in matrix type powders or granules which follows a broader or thinner gaussian distribution. The more viscous is the system during the shaping step, the larger will be the distribution. Yet, depending on the application intended for the extruded product, the ability to control the size and homogeneity of the extruded material may be of paramount importance. It is then very important to be able to obtain a narrow size distribution with a minimum of capsules being larger or smaller than the average size desired for the intended purpose.

In the cases where the crushing step is carried out after the extruded material is cooled below its glass transition temperature, besides the large size distribution of the particles, this crushing step unavoidably loses a certain amount of matter because of the hardness of the material and it can also happen that the encapsulated volatile compound is damaged during this step.

DETAILED DESCRIPTION OF THE PREFERRED EMBODIMENTS

The present invention provides a solution to the problems encountered with the prior art processes.

One object of the present invention is therefore a process for shaping in a granular form a delivery system for the controlled release of a flavor or fragrance compound or composition, which process comprises the steps of:

a) preparing a mixture of a continuous phase carrier containing a volatile flavor or fragrance compound or composition finely divided therein and having a low water content so as to ensure that the glass transition temperature of said mixture is the glass transition temperature of the final product;

b) heating said mixture within a screw extruder to a temperature comprised between 90 and 130° C. to form a molten mass; and c) extruding the molten mass through a die and chopping the molten mass directly as it exits the die, i.e. at the temperature of extrusion. In fact, as it exits the die, the molten mass is already in a plastic condition, thus sufficiently viscous to be cut.

The invention provides an optimized process for shaping a delivery system, and prevents several disadvantages encountered with the systems described in the prior art. In fact, the process of the invention allows, contrary to all the prior systems, to shape and more particularly to cut the molten mass directly as it exits the die for preparing the desired granules. This is not possible with the systems of the prior art which, due to the low viscosity of the molten mass during the extrusion step, all need a cooling or a drying step following the extrusion, and provide therefore particles with a large size distribution and presenting the disadvantages mentioned above.

Contrary to these systems, the invention provides an optimized process for the preparation of an encapsulated volatile compound or composition, namely a flavor or fragrance compound or composition which allows to shape the granule directly as the molten mass exits the die and to thus produce particles with a particularly narrow size distribution. The process of the invention further gives the advantage of avoiding any additional step which was necessary in the prior art following extrusion, to increase the viscosity of the system before the shaping.

In the first step of the process according to the invention, the flavor or fragrance compound or composition is finely divided in the continuous phase constituted by the carrier, namely a carbohydrate matrix, to form a mixture. A low water content is added to the mixture to guarantee that the glass transition temperature Tg of the resulting mixture corresponds to and is substantially the same as that of the desired Tg value of the final product. In other words, contrary to the methods used in the prior art, such as wet-granulation, the glass transition temperature of the mixture before extrusion has already the value required for the final product, which temperature is above room temperature and preferably above 40° C. so that the product can be stored at ambient temperature in the form of a free-flowing powder. As a consequence, the process according to the invention does not need any additional drying step following the extrusion to remove water in order to increase Tg to an acceptable value.

In the second step of the process according to the invention, the mixture is thus extruded in an extruder assembly which maintains the temperature of the mixture at a predetermined temperature which is comprised between 90 and 130° C. This temperature is adapted to the system of the invention: first of all, it has to be above the glass transition temperature of the carbohydrate matrix in order to keep the mixture in the form of a molten mass. Moreover, the mixture which is extruded is composed of a continuous phase containing an active compound or composition finely divided therein, the latter constituting a dispersed phase. These two phases present viscosity values differing by orders of magnitude and it is well known that they will tend to phase separate upon extrusion unless their viscosity is matched. In this particular case, the viscosity of the carrier has to be reduced by adding a plasticiser or by increasing the temperature. As the addition of plasticiser is not desired, the temperature during the extrusion process has to be high enough to avoid a demixing phenomenon common in such a system. The pressure parameter is also set so as to avoid this demixing phenomenon. On the other hand, the latter parameter must be high enough to enable the extrusion at low (T–Tg) values, i.e. to extrude the molten mass while being in plastic condition. Therefore, in order to fulfill all said requirements, the pressure is thus maintained at a value which is below $100 \times 10^5$ Pa, and which is preferably comprised between 1 and $50 \times 10^5$ Pa.

Moreover, high temperatures are limited in the system of the present invention by the boiling point of water in the mixture. In fact, the temperature must be set so as to be below said boiling point, for a given pressure, in order to avoid an expansion of the carrier with water vapor. Therefore, the possible range of temperatures used for the present invention is comprised between 90 and 130°.

As the mixture comes to the die part of the extruder, the temperature is still above the glass transition temperature of the carrier and the mixture is in a plastic condition. The extruder is equipped with a cutterknife and the mixture is thus cut at the temperature of the melt. Once cooled to ambient temperature by the surrounding air, the already cut glassy material does not need to be shaped and dried in a spheroniser or other device, unlike what is the case with the prior art processes.

The process of the invention thus provides capsules with a uniform size. The method according to the invention is very advantageous because the release of volatile compounds such as flavor and fragrance compounds is defined by the physico-chemical properties of the matrix material and occurs generally through dissolution in a solvent or plasticiser, or through thermal or mechanical activation. The specific area of the matrix type delivery system is a parameter which influences the delivery process, a large specific area providing a high molecular flux in the case of a solvent activation. The release through dissolution is thus particularly dependent on the surface area of the particle. The kinetics of flavor delivery is monitored by the size of the solid particles manufactured by the granulation process. As a consequence, in order to provide a uniform kinetically well defined release of the volatile compounds entrapped, the capsules have further to present a narrow distribution. We have discovered that a process according to the invention could advantageously allow the manufacture of extruded flavor or fragrance delivery systems in a granular form and with a narrow size distribution, and this in only one step after the extrusion process, thus dispensing with the cooling, drying and other further processing steps which are current in the prior art methods.

The present invention thus relates to a process for shaping in a granular form a delivery system allowing the controlled release of flavor and fragrance compounds or compositions, which comprises:

a) preparing a mixture of a continuous phase carrier containing a volatile flavor or fragrance compound or composition finely divided therein and having a low water content;

b) heating said mixture within a screw extruder to a temperature comprised between 90 and 130° C. to form a molten mass;

c) extruding the molten mass through a die;

d) chopping the molten mass as it exits the die to provide a product having a glass transition temperature Tg which is essentially the same as that of the continuous phase carrier.

What is intended by low water content is a content in water guaranteeing that the glass transition temperature of said mixture is the glass transition temperature of the final product and which is above room temperature, and more preferably above 40° C.

The pressure during the extrusion step is maintained below $100 \times 10^5$ Pa, and preferably comprised between 1 and $50 \times 10^5$ Pa.

The terms flavor or fragrance compound or composition as used herein are deemed to define a variety of flavor and fragrance materials of both natural and synthetic origin. They include single compounds and mixtures. The process of the invention may be employed to manufacture encapsulated volatile or labile components which may be in liquid or solid form, hydrophilic or hydrophobic. Specific examples of such components may be found in the current literature, e.g. in Perfume and Flavour Chemicals by S. Arctander, Montclair N.J. (USA); Fenaroli's Handbook of Flavour Ingredients, CRC Press or Synthetic Food Adjuncts by M. B. Jacobs, van Nostrand Co., Inc. and are well-known to the person skilled in the art of perfuming, flavoring and/or aromatizing consumer products, i.e. of imparting an odor or a taste to a consumer product.

Natural extracts can also be encapsulated into the systems of the invention; these include, e.g. citrus extracts, such as lemon, orange, lime, grapefruit or mandarin oils, or coffee, tea, cocoa, mint, vanilla or essential oils of herbs and spices, amongst other.

In practicing this invention, the fragrance or flavor component is firstly dispersed by mechanical agitation in a homogeneous solution of a matrix or carrier material.

As the matrix, there can be used any carbohydrate or carbohydrate derivative which can be readily processed through extrusion techniques to form a dry extruded solid. Particular examples of suitable materials include those selected from the group consisting of sucrose, glucose, lactose, maltose, fructose, ribose, dextrose, isomalt, sorbitol, mannitol, xylitol, lactitol, maltitol, pentatol, arabinose, pentose, xylose, galactose, Trehalose®, hydrogenated corn syrup, maltodextrin, agar, carrageenan, gums, polydextrose and derivatives and mixtures thereof. Other suitable carrier ingredients are cited in reference texts such as H. Scherz, Hydrokolloide: Stabilisatoren, Dickungs und Geliermittel in Lebensmittel, Band 2 der Schriftenreihe Lebensmittelchemie, Lebensmittelqualität, Behr's Verlag-GmbH & Co, Hamburg, 1996. According to the invention there will be preferably used a maltodextrin having a dextrose equivalent not above twenty ($\leq 20$ DE).

The above-mentioned matrix materials are hereby given by way of example and they are not to he interpreted as limiting the invention. Although polysaccharides are mentioned above as specific examples, it is clear that any material which is extrudable and currently used as a matrix material in the production of extruded solids is adequate for the aim of the invention and is therefore hereby included in the latter.

An emulsifier agent is preferably added to the mixture constituted by the matrix component and the volatile material. Typical examples include lecithin and citric acid esters of fatty acids, but other suitable emulsifiers are cited in reference texts such as Food emulsifiers and their applications, 1997, edited by G. L. Hasenhuettl and R. W. Hartel.

The glass transition temperature of the volatile compound/carbohydrate mixture depends on the amount of water added to the initial mixture. In fact, it is well known in the art that the Tg decreases when the proportion of water increases. In the present invention, the proportion of water added to the mixture will be low, i.e. such that the glass transition temperature of the resulting mixture is substantially equal to the glass transition temperature desired for the final flavor or fragrance delivery system, i.e. the extruded product. Now, as mentioned above, a requirement for the resulting encapsulated compound or composition is to present a glass transition temperature Tg significantly above the temperature at which it will be stored and subsequently used. The critical temperature must thus be at least above room temperature and preferably above 40° C. The proportions in which water is employed in the present invention therefore vary in a wide range of values which the skilled person is capable of adapting and choosing as a function of the carbohydrate glass used in the matrix and the required Tg of the final product.

For instance, for a carbohydrate glass having a DE (dextrose equivalent) of 18, proportions from 5 to 10% of water in the mixture can be used.

The softening or glass transition temperature is preferably kept above 40° C. to guarantee the free flowing nature of the produced powder samples at ambient temperature. A low water content to guarantee that the carrier's glass transition temperature is above room temperature and preferably above 40° C. is thus added to the mixture.

The extruding step requires an extruding apparatus. A commercially acceptable extruding apparatus is that under the trade name designation Clextral BC 21 twin-screw extruder equipped with a cutterknife allowing to chop the melt at the die exit, when it is still in a plastic condition. However, extruding apparatuses are not limited to the twin screw variety and may also include, for example, single screw, ram, or other similar extrusion methods. The mentioned extruding apparatuses allow to extrude at pressure which are sufficiently high to provide a molten mass in a plastic condition.

The extrusion apparatus is equipped with a temperature regulation mechanism which maintains the temperature of the mixture at a temperature above the glass transition temperature of the carrier, set to a value comprised between 90 and 130° C. through the entire extrusion process.

During the extrusion process, the mixture is forced through a die having an orifice with a predetermined diameter which ranges from about 0.250 to 10 mm and preferably from 0.7 to 2.0 mm. However, much higher diameters for the die are also possible. The die orifice is at the same temperature as that of the rest of the apparatus, and is equipped with a cutterknife or any other cutting device allowing to chop the melt as it exits from the die, when it is still plastic. The product which is cut is thus still at a temperature which is above the glass transition temperature of the matrix.

The length of the pieces is regulated by controlling the stroke rate of the specific cutting apparatus.

The severed pieces are subsequently cooled to ambient temperature by the surrounding air. No drying or further treatment is needed. The resulting granules present a size uniformity as it is apparent from the comparative example presented hereafter and from FIGS. 2 and 3 here-annexed. This size uniformity of the resulting capsules allows an improved control of flavor and fragrance release.

The invention will be now illustrated by way of the following examples and with reference to FIGS. 1–3, but is not limited to these examples. Temperatures are given in degrees centigrade and abbreviations have the meaning common in the art.

EXAMPLE 1

Figure 1:
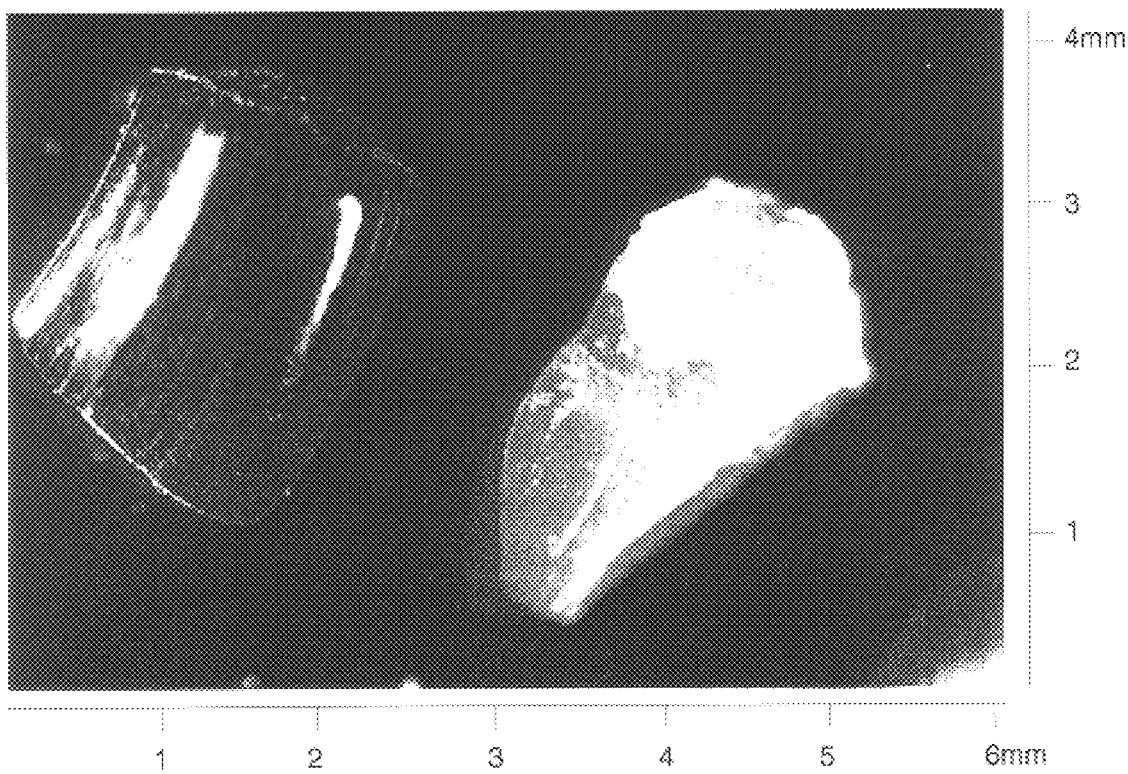
FIG. 1 shows a picture of a granular extruded product obtained according to a known process comprising cooling after the extrusion and then reducing the mass to granular form according to current techniques (right side of the picture) and an extruded product obtained according to the presently described process (left side of the picture).
Figure 2:
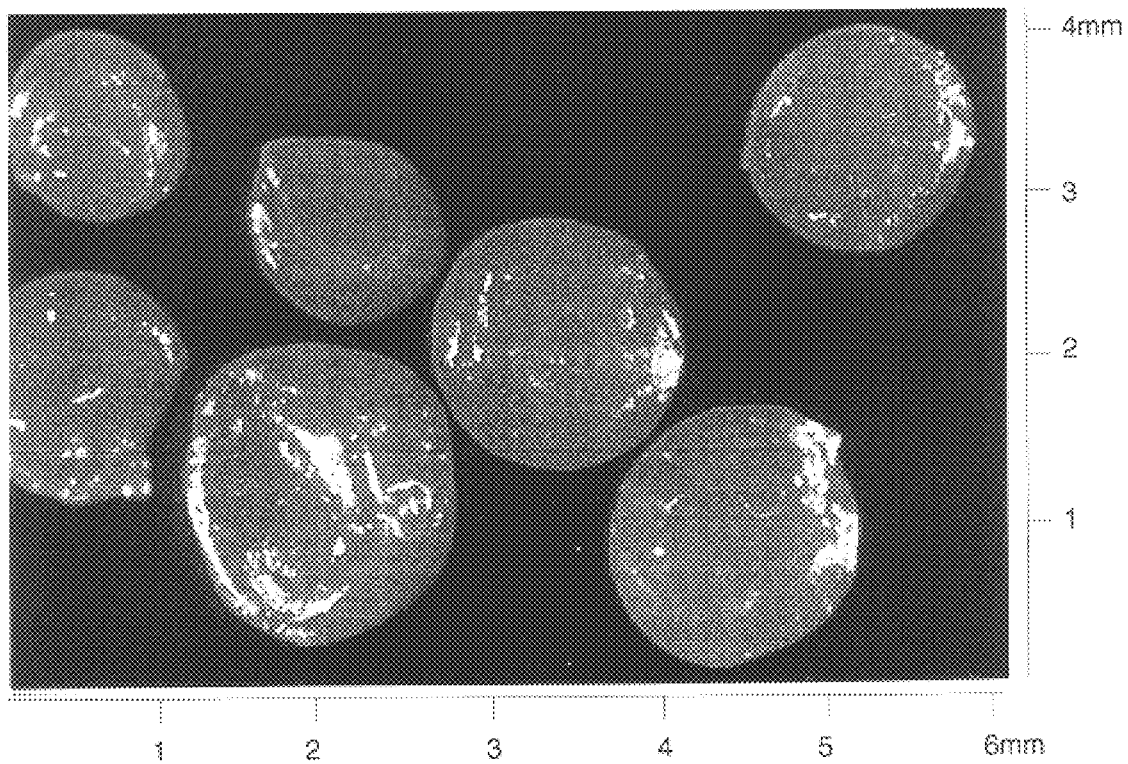
FIG. 2 and FIG. 3 show micrographs of granular extruded products manufactured according to the presently described process.
Figure 3:
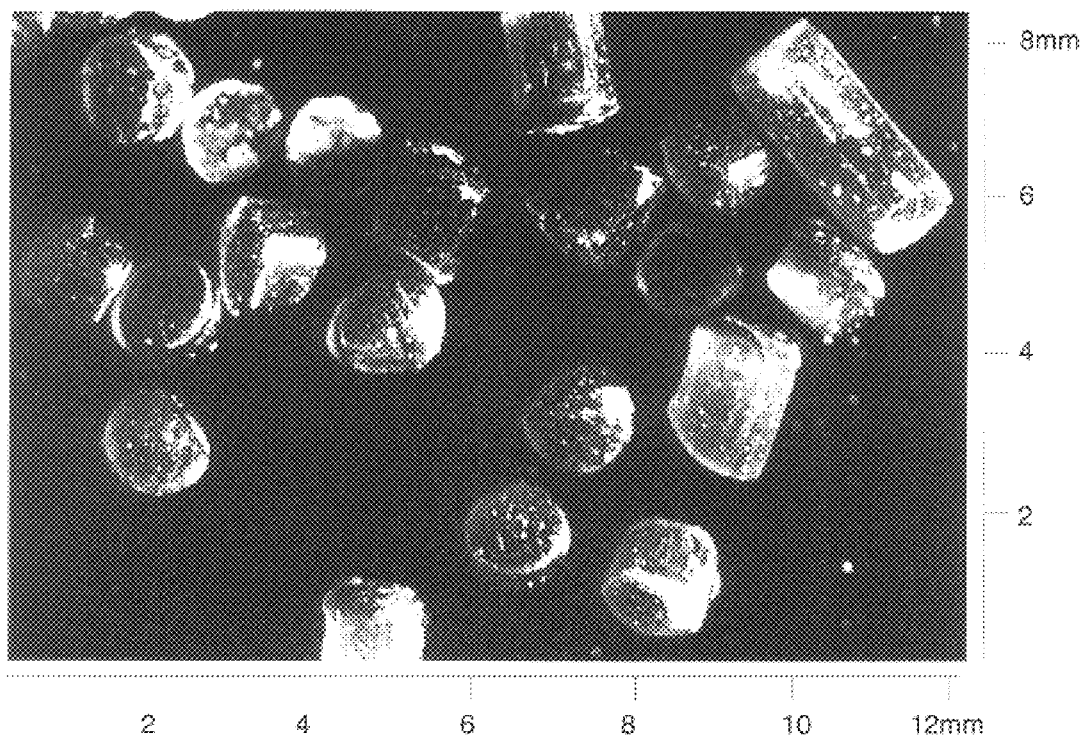

A dry blended formulation was prepared by admixing the following ingredients:

| Ingredients | Parts by weight |
| --- | --- |
| Strawberry flavor[1] | 3 |
| Lecithin | 1 |
| Water | 6 |
| Maltodextrim 19 DE | 90 |
| Total | 100 |

[1]52312 A; origin: Firmenich SA, Geneva, Switzerland

The powder blend was extruded at a throughput of 5 kg/h through 0.7 mm die holes using a Clextral BC 21 twin-screw extruder equipped with a cutterknife allowing to chop the melt at the die exit while it is still plastic. At the low water content needed to guarantee a glass transition above 40° at constant sample composition, the temperature of the melt in the front plate was of 105° and the plastic pressure in the extruder was preferably kept below $20 \times 10^5$ Pa.

EXAMPLE 2

A spray-dried formulation was prepared by admixing the following ingredients:

| Ingredients | Parts by weight |
| --- | --- |
| Orange flavor[1] | 10 |
| Lecithin | 1 |
| Water | 7 |
| Maltodextrin 19 DE | 82 |
| Total | 100 |

[1]502164 T; origin: Firmenich SA, Geneva, Switzerland

The powder was extruded at a throughput of 50 kg/h through 1 mm die holes using a Clextral BC 45 twin-screw extruder equipped with a cutterknife allowing to chop the melt at the die exit while it is still plastic. At the low water content needed to guarantee a glass transition above 40° at constant sample composition, the temperature of the melt in the front plate was of 105° and the static pressure in the extruder was preferably kept below $1–20 \times 10^5$ Pa.

EXAMPLE 3

A dry blended formulation was prepared by admixing the following ingredients:

| Ingredients | Parts by weight |
| --- | --- |
| Fragrance | 3 |
| Silicone dioxide | 2 |

-continued

| Ingredients | Parts by weight |
| --- | --- |
| Lecithin | 1 |
| Water | 7 |
| Maltodextrin 19 DE | 87 |
| Total | 100 |

The powder blend was extruded at a throughput of 5 kg/h through 2 mm die holes using a Clextral BC 21 twin screw extruder equipped with a cutterknife allowing the chopping of the melt at the die exit while it is still plastic. At the low water content needed to guarantee a glass transition above 40° at constant sample composition, the temperature of the melt in the front plate was of 105° and the static pressure in the extruder was preferably kept below $20 \times 10^5$ Pa.

The fragrance used in the above composition was obtained by admixture of the following ingredients:

| Ingredients | Parts by weight |
| --- | --- |
| 1-Pentyl-2-propenyl acetate | 10 |
| Hexylcinnamic aldehyde | 250 |
| Cetalox ®[1] | 5 |
| Tricyclo[5.2.1.0(2,6)]dec-3,4-en-1-yl acetate | 90 |
| Coumarine | 10 |
| 2-Pentyl-1-cyelopentanol[2] | 25 |
| Cyclamen aldehyde | 40 |
| 10%* α-Damascone[2] | 25 |
| Dihydromyrcenol | 40 |
| Habanolide ®[3] | 60 |
| Iralia ® Total[4] | 30 |
| Lilial ®[5] | 80 |
| Linalol | 30 |
| Lorysia ®[6] | 100 |
| Muscenone[7] | 50 |
| Tetrahydro-2-isobutyl-4-methyl-4(2H)-pyranol[2] | 15 |
| Phenylhexanol[8] | 50 |
| Hexyl salicylate | 40 |
| Vertofix coeur[9] | 50 |
| Total | 1000 |

*in dipropyleneglycol
[1] 8,12-epoxy-13,14,15,16-tetranorlabdane; origin: Firmenich SA, Geneva, Switzerland
[2] origin: Firmenich SA, Geneva, Switzerland
[3] pentadecenolide; origin: Firmenich SA, Geneva, Switzerland
[4] methyl ionone; origin: Firmenich SA, Geneva, Switzerland
[5] origin: Givaudan-Roure, Vernier, Switzerland
[6] cis-4-(1,1-dimethyl)-1-cyclohexyl acetate; origin: Firmenich SA, Geneva, Switzerland
[7] 3-methyl-(4,5)-cyclopentadecen-l-one; origin: Firmenich SA, Geneva, Switzerland
[8] γ-methyl-benzene pentanol; origin: Firmenich SA, Geneva. Switzerland
[9] origin: International Flavors & Fragrances Inc., USA EXAMPLE 4
Comparative Example of the Size Distribution of Particles Manufactured According to Different Methods The following table shows the size distribution of particles manufactured respectively using (i) spray-drying, (ii) leaflash drying, (iii) multistage drying, (iv) glass-granulation using a 1.5 mm mesh size in the breaker and (v), (vi), (vii) granulation according to the present invention. More particularly, the size distribution of particles prepared according to the method described in examples 1, 2 and 3, is reported in columns (v), (vi) and (vii) respectively.

| Mesh Size [mm] | Weight fraction [%] | | | | | | |
| --- | --- | --- | --- | --- | --- | --- | --- |
| | (i) | (ii) | (iii) | (iv) | (v) | (vi) | (vii) |
| 2.000 | 0 | 0 | 0 | 0 | 0 | 0 | 85 |
| 1.400 | 0 | 0 | 0 | 70 | 0 | 95 | 13 |
| 1.000 | 0 | 0 | 0 | 54 | 0 | 5 | 2 |
| 0.700 | 0 | 0 | 0 | 8 | 67 | 0 | 0 |
| 0.500 | 0 | 0 | 6 | 7 | 28 | 0 | 0 |
| 0.250 | 0 | 14 | 42 | 5 | 5 | 0 | 0 |
| 0.150 | 0 | 26 | 43 | 3 | 0 | 0 | 0 |
| 0.075 | 20 | 24 | 9 | 3 | 0 | 0 | 0 |
| 0–0.075 | 80 | 35 | 0 | 3 | 0 | 0 | 0 |

What is claimed is:

1. A process for the preparation of a flavor or fragrance delivery system, which comprises:
   a) preparing a mixture of a continuous phase carrier containing a volatile flavor or fragrance compound or composition which is finely divided therein, the mixture having a water content such that said mixture has a glass transition temperature above room temperature;
   b) heating the mixture within a screw extruder to a temperature of between 90 and 130° C. to form a molten mass;
   c) extruding the molten mass through a die;
   d) chopping the molten mass as it exits the die to provide a flavor or fragrance delivery system in a granular form having a glass transition temperature Tg which is essentially the same as that of the mixture.

2. The process according to claim 1 wherein the extruding of the molten mass is carried out at a pressure below $100 \times 10^5$ Pa.

3. The process according to claim 1 wherein the extruding of the molten mass is carried out at a pressure comprised between $1 \times 10^5$ and $50 \times 10^5$ Pa.

4. The process according to claim 1 wherein the mixture comprises between 5 and 10% of water.

5. The process according to claim 1 wherein the glass transition temperature of the mixture is above room temperature and the volatile flavor or fragrance is encapsulated by the carrier.

6. The process according to claim 1 wherein the glass transition temperature of the carrier is above 40° C.

7. The process according to claim 1, wherein the continuous phase carrier is selected from the group consisting of sucrose, glucose, lactose, fructose, maltose, ribose, dextrose, isomalt, sorbitol, mannitol, xylitol, lactitol, maltitol, pentatol, arabinose, pentose, xylose, galactose, trehalose, hydrogenated corn syrup, maltodextrin, agar, carrageenan, gums, polydextrose and derivatives and mixtures thereof.

8. The process according to claim 1 wherein the diameter of the die is comprised between 0.7 and 2.0 mm.

9. A granule produced by the process of claim 1.

10. The process according to claim 1, wherein the mixture prepared in step a) has a water content such that the glass transition temperature of the mixture is above 40° C.

* * * * *

UNITED STATES PATENT AND TRADEMARK OFFICE
CERTIFICATE OF CORRECTION

PATENT NO. : 6,607,771 B2
DATED : August 19, 2003
INVENTOR(S) : Benczedi et al.

It is certified that error appears in the above-identified patent and that said Letters Patent is hereby corrected as shown below:

<u>Title page,</u>
Please delete Items "[22] PCT Filed: Aug. 23, 2000
                       [86] PCT No.:    PCT/IB00/01155
                       § 472 ©(1)
                       (2), (4) Date:    June 27, 2001
                       [87] PCT Pub. No.: WO 01/17372
                           PCT Pub. Date: Mar. 15, 2001"
After Item [21], Application No, insert -- [22] Filed: May 3, 2001 --.

Signed and Sealed this

Twenty-seventh Day of July, 2004

JON W. DUDAS
*Acting Director of the United States Patent and Trademark Office*